United States Patent
DeVorchik et al.

(10) Patent No.: US 7,953,745 B2
(45) Date of Patent: May 31, 2011

(54) INTELLIGENT CONTAINER INDEX AND SEARCH

(75) Inventors: David G. DeVorchik, Seattle, WA (US); Jeffrey C. Belt, Bellevue, WA (US); Timothy P. McKee, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 12/614,162

(22) Filed: Nov. 6, 2009

(65) Prior Publication Data

US 2010/0057808 A1     Mar. 4, 2010

Related U.S. Application Data

(62) Division of application No. 11/181,996, filed on Jul. 15, 2005, now Pat. No. 7,630,999.

(51) Int. Cl.
*G06F 17/00*     (2006.01)
(52) U.S. Cl. ......... 707/761; 707/802; 707/822; 707/828
(58) Field of Classification Search ........... 707/600–828
See application file for complete search history.

(56) References Cited

U.S. PATENT DOCUMENTS 6,038,610 A * 3/2000 Belfiore et al. ............... 709/203

* cited by examiner

*Primary Examiner* — Isaac M Woo
(74) *Attorney, Agent, or Firm* — Shook, Hardy & Bacon L.L.P.

(57) ABSTRACT

Aspects are introduced for indexing contents of a shell namespace extension. A plurality of files are indexed, and it is encountered that one of the files contains at least one file reference. The file is then accessed as a shell namespace extension so that the file reference can be indexed.

18 Claims, 6 Drawing Sheets

| Name | Type | Author | Size | Notes |
|---|---|---|---|---|
| foo.doc | Word docu... | John Doe | 35KB | Must read by Tues |
| BizDev.doc | Word docu... | John Doe | 39KB | Definite must read. |
| product_research.ppt | PowerPoint... | George Burdell | 158KB | Needs revisions. |
| tech_spec.pdf | PDF docum... | George Burdell | 1.2MB | Must read. |
| Sales Database | Database | John Doe | 54MB | Confidential! |

List Created: June 6, 2005 10:02am
By: John Doe
Updated: June 6, 2005 1:30pm
Notes: Must read

FIG. 3

INTELLIGENT CONTAINER INDEX AND SEARCH

CROSS-REFERENCE TO RELATED APPLICATIONS

This application is a divisional of and claims priority from nonprovisional application Ser. No. 11/181,996, filed Jul. 15, 2005, and entitled "Intelligent Container Index and Search." application Ser. No. 11/181,996 is incorporated herein in its entirety.

BACKGROUND

A necessary part of virtually every computer is a file system, used for storing computer programs and associated data. Recent advances provide for the searching of file systems, enabling users to easily locate any file. In the case of data files, not only can users search based on the name of a file, but they can further search based on attributes of the file (e.g., author, date of creation) and even on the textual contents within the file (e.g., words in a document, words in an email).

To some extent, the ability to search has been enhanced by advances in indexing, which is the process of cataloging the contents of one or more file systems in such a way as to improve the time it takes to perform a search. Such indexes are commonly associated with Internet search engines (e.g., MSN Search, Google) which catalog huge swaths of World Wide Web content. But indexing has also come to the desktop computer, enhancing the searching of local file systems.

While cataloging the contents of a computer, a search indexing program may encounter file containers. Types of file containers may include compressed and/or archived files (e.g., file formats such as zip, cabinet (CAB), tape archive (TAR) and other collections of associated file references. File references may act as placeholder files which merely point to a file somewhere on a local or remote file system. File references may also point to items other than files, such as a specific email within a file containing multiple emails.

When an indexing service indexes a particular file and also indexes a file reference having the particular file as its target, the indexing service may create multiple index entries for essentially the same file. As a result, the same file may appear multiple times in a particular set of search results, inevitably confusing the user. Furthermore, if a referenced file is located on a remote file system, an indexing program may not know to catalog its contents, improperly preventing its inclusion in search results.

Other problems may arise when an indexing program encounters a file container, such as a zip file. An indexing program may not be able to access the contents of the file container, excluding potentially relevant results from a search. But even if a file container is accessible, an indexing program may be unable to properly index files and file references stored within the file container, possibly leading to confusing or incomplete search results.

SUMMARY

Aspects relate to indexing contents of a shell namespace extension by indexing a plurality of files that are stored in a storage. A processor encounters a file that contains at least one file reference, and access the file as a shell namespace extension so that it can index the file reference.

BRIEF DESCRIPTION OF THE SEVERAL VIEWS OF THE DRAWINGS

Aspects of the present invention are illustrated, by way of example and not limitation, in the accompanying figures in which like reference numerals indicate similar elements and in which:

FIG. 3 depicts an illustrative interface for a list file.

DETAILED DESCRIPTION

Aspects provide methods and systems for intelligently indexing and searching the contents of a file system, including the indexing and searching of file containers (e.g., zip files or list files).

It is noted that various connections may be set forth between elements in the following description. Unless specified otherwise, these connections may be direct or indirect and this specification is not intended to be limiting in this respect.

Overview

By intelligently indexing the contents of file containers, duplicative, confusing, or incomplete search results can be avoided. Standard files contained in archives and/or compressed files may be indexed normally, whereas file references pointing to locally stored files may only be partially indexed.

General-Purpose Computing Environment

Figure 1:
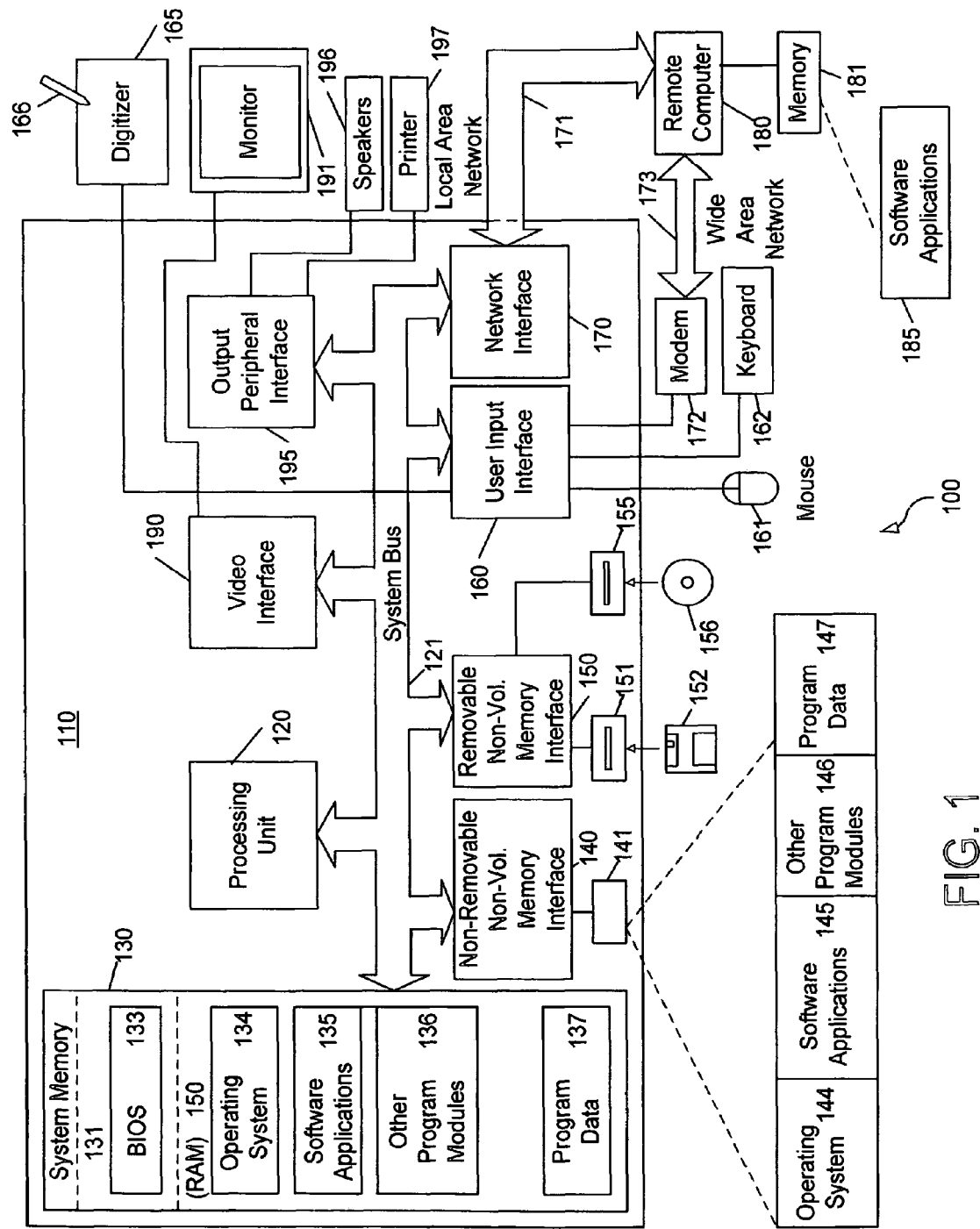
FIG. 1 illustrates a schematic diagram of a general-purpose digital computing environment.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to anyone or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessorbased systems, set top boxes, programmable consumer electronics, network computers, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, and removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (OVO) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, software applications 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, software applications 145, other program modules 146, and program data 147. Note that these components can either be the same as or different from operating system 134, software applications 135, other program modules 136, and program data 137. Operating system 144, software applications 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network computer, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote software applications 185 as residing on memory device 181. It will be appreciated that the network connections shown are exemplary and other means of establishing a communications link between the computers may be used.

In some aspects, a pen digitizer 165 and accompanying pen or stylus 166 are provided in order to digitally capture freehand input. Pen digitizer 165 may further use capacitive or resistive technologies enabling an active stylus or a passive stylus (e.g., a finger or other pointing device). Although a direct connection between the pen digitizer 165 and the user input interface 160 is shown, in practice, the pen digitizer 165 may be coupled to the processing unit 110 directly, parallel port or other interface and the system bus 130 by any technique including wirelessly. Also, the pen 166 may have a camera associated with it and a transceiver for wirelessly transmitting image information captured by the camera to an interface interacting with bus 130. Further, the pen may have other sensing systems in addition to or in place of the camera for determining strokes of electronic ink including accelerometers, magnetometers, and gyroscopes.

It will be appreciated that the network connections shown are exemplary and other means of establishing a communications link between the computers can be used. The existence of any of various well-known protocols such as TCPIIP, Ethernet, FTP, HTTP and the like is presumed, and the system can be operated in a client-server configuration to permit a user to retrieve web pages from a web-based server. Any of various conventional web browsers can be used to display and manipulate data on web pages.

Index & Search

Figure 2:
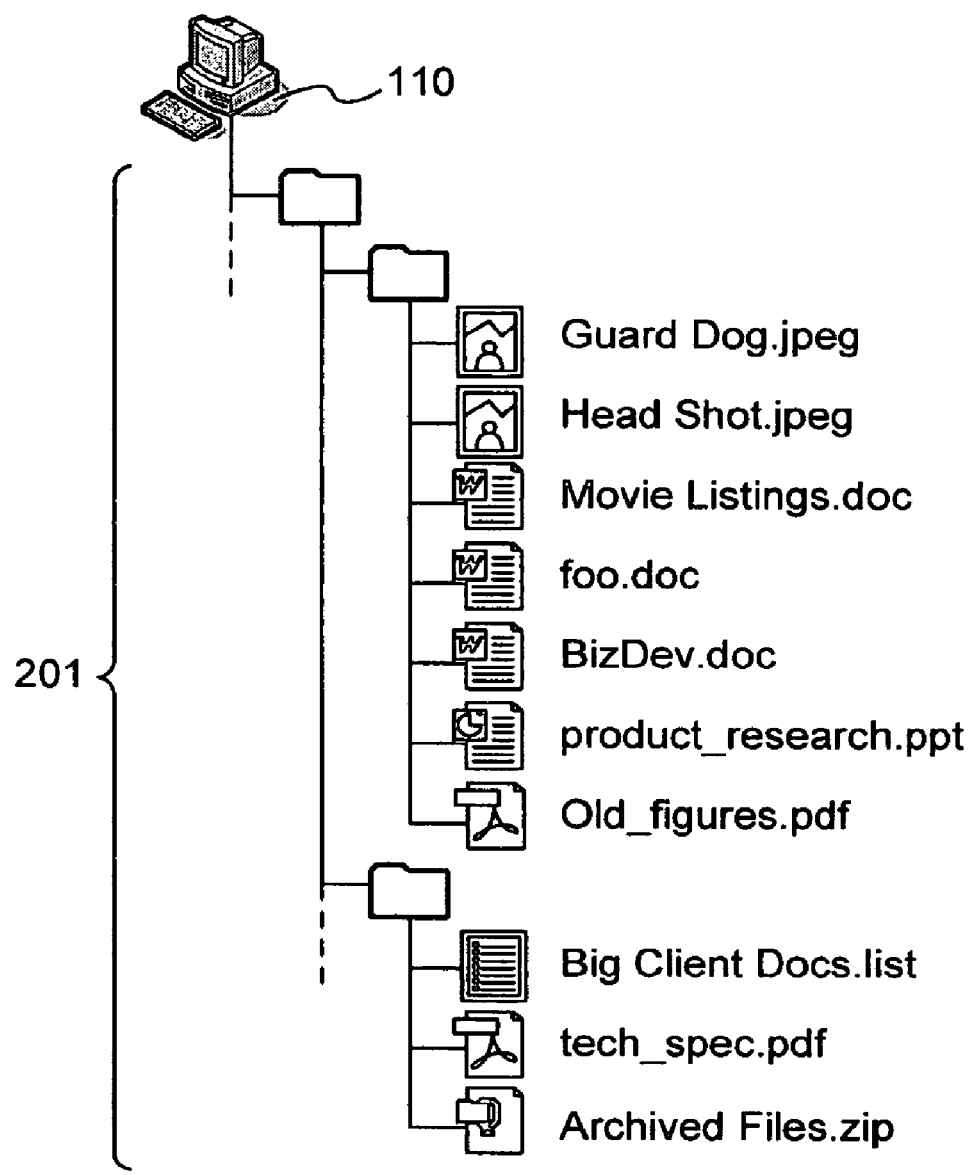
FIG. 2 depicts an illustrative portion of a local file system.

FIG. 2 depicts an illustrative portion of a local file system 201 for computer 110. Files are organized under folders and subfolders, providing a well-known interface metaphor for a user to organize the contents of the file system. The contents of file system 201 include files which can be searched when a user is looking for a particular item.

Perhaps the slowest method for searching the files stored on computer 110 is simply to walk all the contents of all the files looking for a specified search string (e.g., "annual report") at the time of the search request. This quite possibly would take hours to provide complete results, which at best would be an unnecessary waste of time. To speed the process, many search programs employ an indexing system to enable faster search results. An index is typically a data structure designed to significantly shorten search times. An indexing algorithm walks the contents of file system 201 prior to a search and creates entries in an index structure for each of the items it encounters. When a search is requested, searchable items may be located much faster by using the specialized data structure.

At a minimum, a search program (and its indexing component) may only search file names. For example, a user may only be able to find the file "BizDev.doc" by remembering its name or a portion thereof. Search programs may additionally allow searching based on other intrinsic properties or metadata of an item (e.g., creation date, modified date, author). Using the previous example, a user may be able to find "BizDev.doc" by remembering who authored it, or the last time it was edited. More advanced search programs may further allow searching of all text associated with a file, including extrinsic properties like comments and the textual content of the file itself. Again, using the previous example, a user may be able to find "BizDev.doc" by remembering a note associated with the file (e.g., "Important Big Client document") or remembering a word or phrase from the file itself (e.g., "business development guidelines").

The files stored in file system 201 present different levels of complexity when it comes to indexing and searching. At a minimum, simple intrinsic properties such as file name and creation date are accessible through straightforward calls to an operating system. However, extrinsic properties and textual content may require specialized code. One method for accessing information in disparate file types is to use different specialized code for each type of file. For example, a Microsoft Word® document may store information in one fashion and require code specialized for Word documents while an Adobe Acrobat® Portable Document Format (PDF) document may require a completely different method for accessing its textual content and extrinsic properties. Such specialized code may be referred to as an IFilter or IFilter interface. Differing file types may each have an IFilter which enables indexing services, search programs, and other software to access the properties and textual content of documents of that file type. So there may be IFilters for Microsoft Word® documents, Adobe Acrobat® documents, HTML documents, and so forth.

File containers may include compressed and/or archive files, and may contain files and file references. One form of specialized file container is a list file. A list file contains a collection of file references, each pointing to another file. A static list may include a user-selected list of file references, while a dynamic list may include an automatically updated list of file references. Dynamic lists may be query-based, automatically adding and removing file references when the target files to which the references refer change their attributes or content. For example, a dynamic list containing references to all the files created by author John Doe may automatically update when John Doe creates a new file. In addition, static lists in particular may enable additional extrinsic attributes to be applied to the file references contained. These attributes may include notes specific to each file reference within the list. Although currently not the case, other file containers (e.g., dynamic lists, zip files, etc.) may eventually allow the addition of extrinsic attributes to be applied to each file or file reference they contain.

Figure 4:
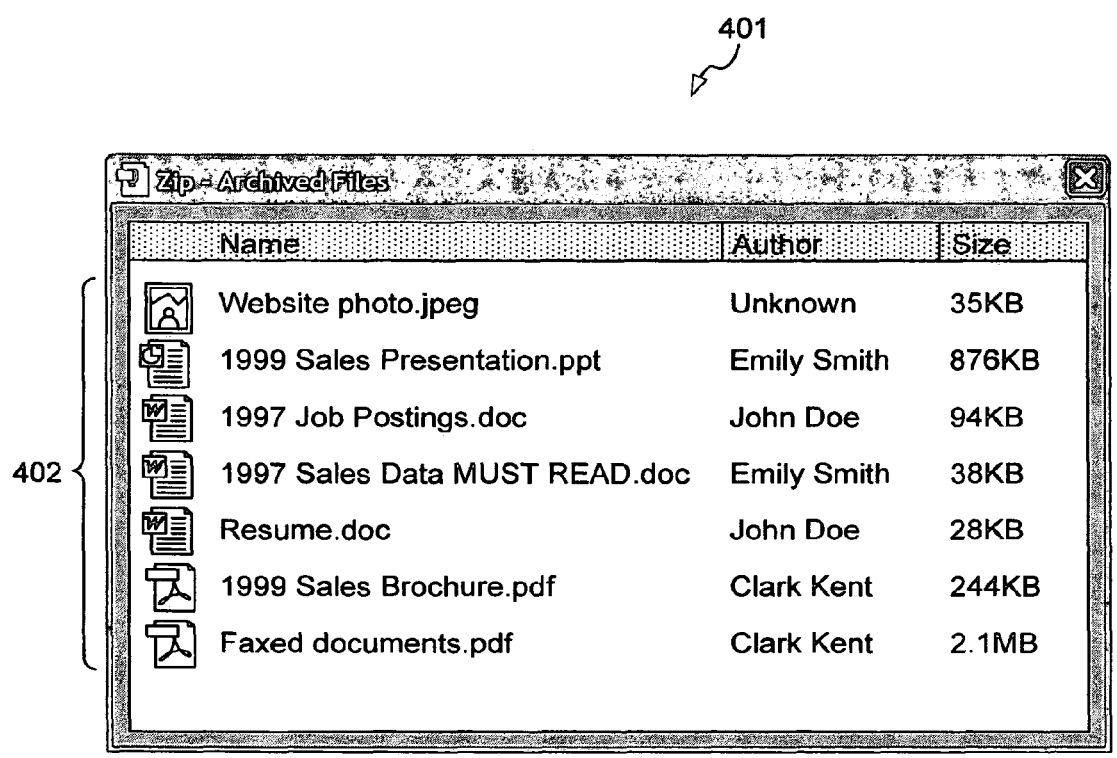
FIG. 4 depicts an illustrative interface for a zip file.

File containers may present an additional level of complexity when accessing properties and textual content. FIG. 3 depicts an illustrative interface 301 for list file "Big Client Docs.list" and FIG. 4 depicts an illustrative interface 401 for zip file "Archived Files.zip." As the list interface 301 shows, a list file may contain references to a collection of files 302 assembled by the list creator. In addition to the files 302, the list also includes intrinsic properties 303 and extrinsic properties 304. Intrinsic properties 303 are those properties which are inherent in a file, including the author's identity, significant dates, and so forth. Extrinsic properties 304 include those which may be modified directly by a user, such as notes associated with each of the file references contained within a list. Although not shown in zip interface 402, a zip file may also include intrinsic and extrinsic properties. The zip file shown here includes a collection of files 402 which have been archived together. Zipped files 402 differ from listed files 302 in that the actual files themselves are stored within the zip file, whereas the listed files are only references pointing to the actual files located elsewhere.

An IFilter for each type of file container may enable access to intrinsic and extrinsic properties of each container, similar to other file types. Such IFilters may further enable access to the lists of files stored within each container. This information, accessed by an indexing service using the appropriate IFilter, can then be provided as part of a search result. For example, list file "Big Client Docs.list" contains a file reference to "foo.doc," among others. Searching for "foo.doc" may then return the original file "foo.doc" from the local file system, plus the search would return the list file "Big Client Docs.list" since that text was indexed using the list IFilter.

Such container IFilters may be complemented through the creation of protocol handlers. A protocol handler is a piece of software used by other software, such as an indexing service, to access and read various storage systems, including file systems, email clients, calendar programs, and so forth. Protocol handlers enable other software to utilize the data hierarchy of the underlying storage system and to treat individual elements within the storage system as discrete items. Creating a protocol handler for a file container such as a list allows the container to be accessed as though it were a folder, and to return a path through itself to individual items within the list. In this fashion, an indexing service which initially utilizes an IFilter to merely get a listing of the contents within a list may now actually access those contents and index them individually.

A protocol handler for file containers may provide a file container with the ability to act as a shell namespace extension. In this fashion, files contained in the file container become items within a namespace, the namespace being an extension of the directory structure in which the container is found.

Creating a protocol handler for a list may create duplicate index entries for the same target file if the protocol handler does not have specific intelligence about which attributes of the items in a list should be indexed. For example, the PowerPoint document "product research.ppt" is referenced by "Big Client Docs.list." The document is in the local file system, and has therefore already been indexed by an indexing service. If the file was fully indexed again as an item in the list, it would subsequently appear multiple times in any results list. However, giving the protocol handler specific intelligence to only permit limited indexing helps allay this problem.

This specific intelligence can basically be boiled down to two rules: (1) If a target file referenced within a file container is outside the scope of what an indexing service indexes (e.g., the file is on a remote machine which is not currently indexed), then all intrinsic and extrinsic properties, as well as all content, are indexed; and (2) If a target file referenced within a file container is within the scope of the indexing service (e.g., on the local file system), then only the extrinsic properties of the target file associated with the list are indexed. Using these two rules, items referenced within 'a file container that are outside the scope of indexing may be fully indexed and be returned in a search. In addition, duplicative search results are avoided by only indexing the extrinsic properties of local files.

Figures 5, 6:
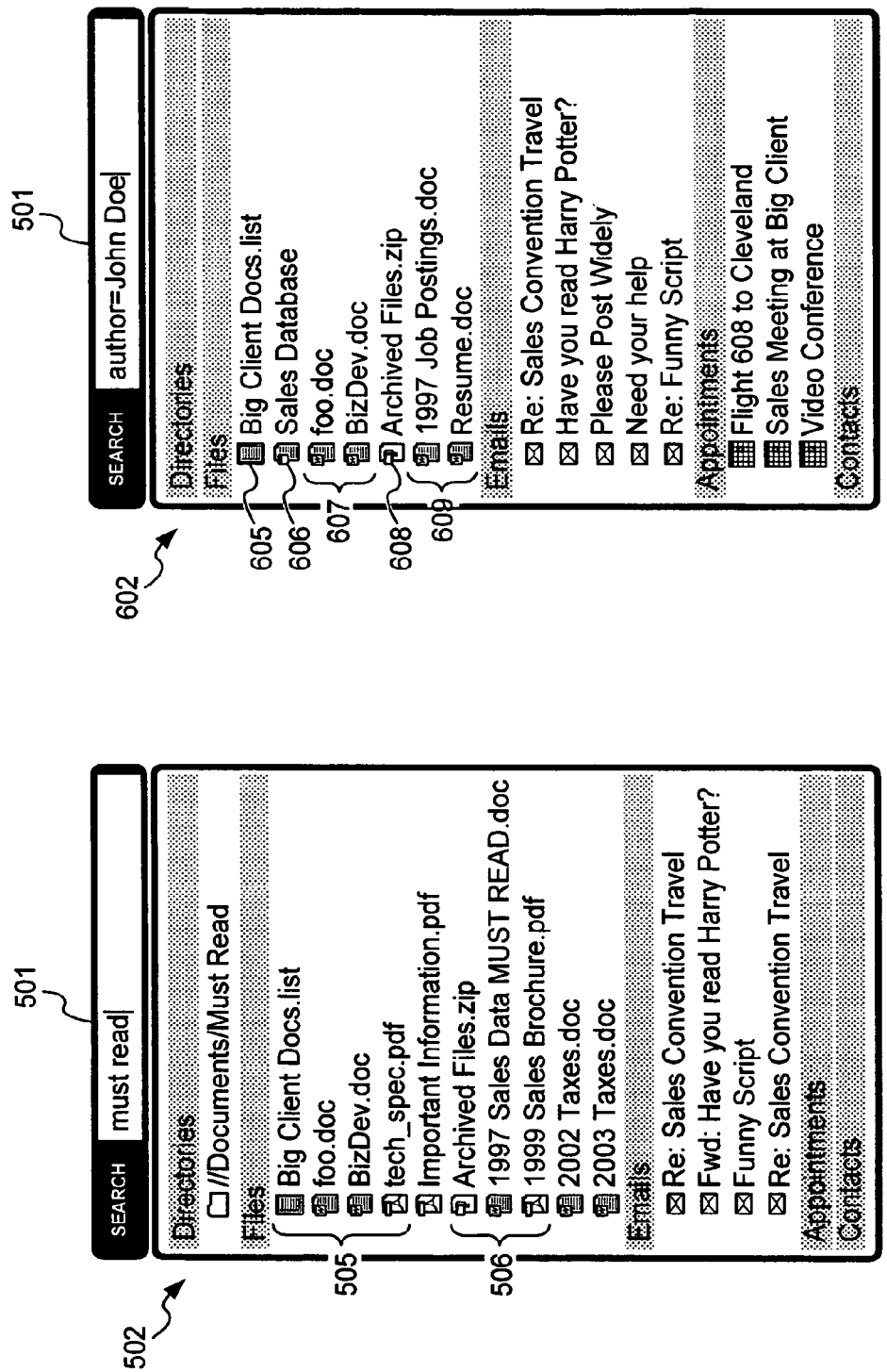
FIGS. 5 and 6 depict illustrative search results.

FIGS. 5 and 6 depict two illustrative search results 502, 602 based on searches of file system 201. The search results displayed here represent merely one illustrative method of providing search results. The display is not intended to limit the invention in any manner. For each result, a search has been entered in search box 501. The first search, "must read," searches the files and items previously indexed by an indexing service. Some of the files 505 referenced by the list "Big Client Docs.list," having extrinsic notes including the phrase "must read," are listed in search results 502. Furthermore, some of the files 506 stored in "Archived Files.zip" are listed, as they contain "must read" either in their file name or elsewhere within their content.

Search results 602 searches for files where the intrinsic property "author" is set to "John Doe." It should again be noted that the syntax of the search query and layout of the results are merely for illustrative purposes. Because author is an intrinsic property of the files referenced by the list "Big Client Docs.list," only referenced files which are not in the local file system are indexed based on this property. As such, remote file Sales Database 606, apparently having John Doe as their author, shows up under list 605. Files "foo.doc" and "BizDev.doc" 607 also show up in the search results, not because of their being referenced by the list, but because the actual files have been indexed and have an author of John Doe. As locally referenced files, the two files 607 do not appear as search results in their capacities as list members because they have not been indexed based on their intrinsic properties.

In this fashion, no file is unnecessarily duplicated in a set of search results Likewise, files which may lie outside the normal scope of a search can be fully included in search results by their mere reference in a list or other file container.

Figure 7:
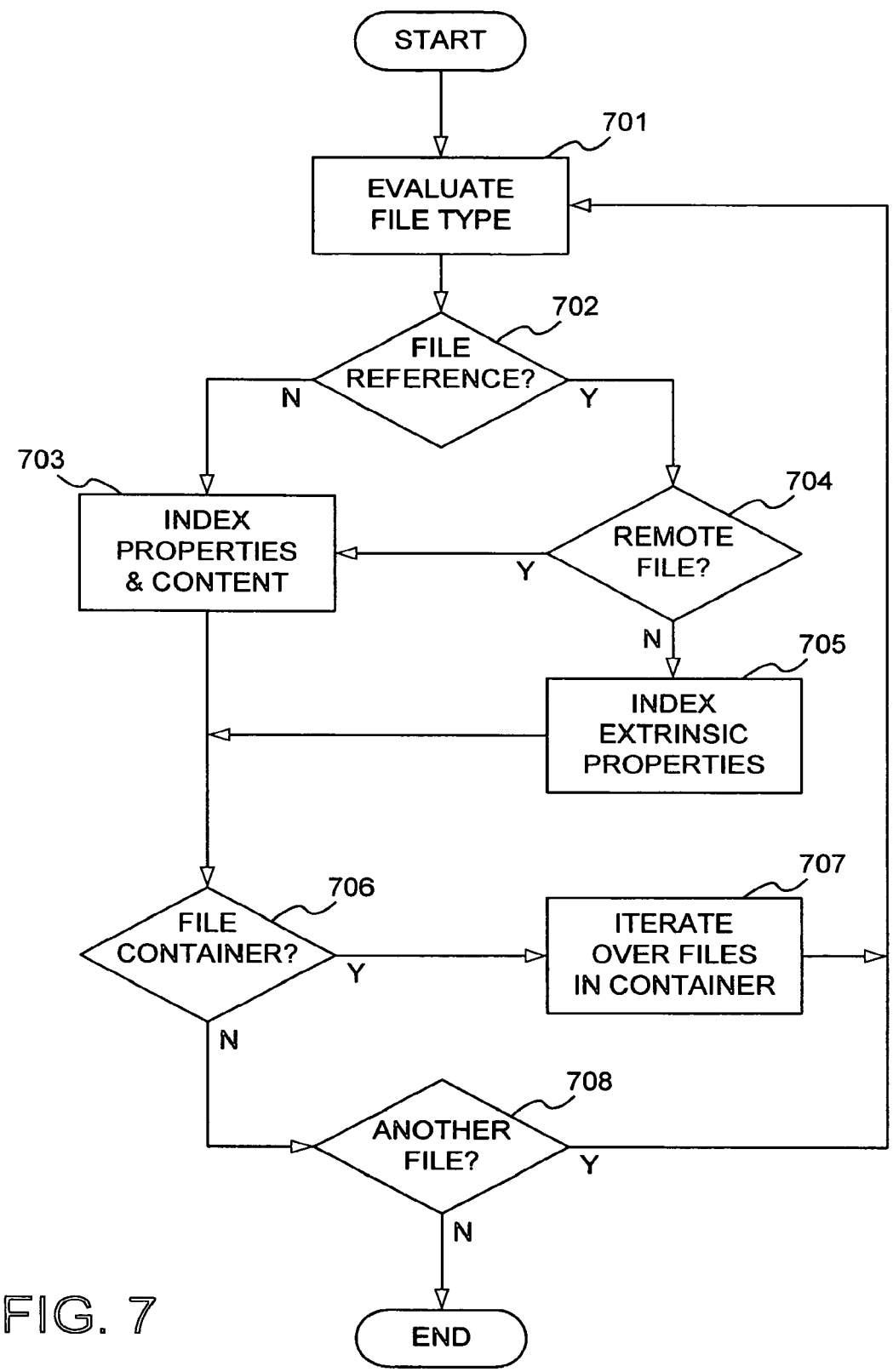
FIG. 7 is a flowchart showing an illustrative method for indexing file containers.

FIG. 7 is a flowchart showing a method for indexing files including file containers. The steps displayed present one illustrative example of performing the method, but alternative methods may fall within the scope and spirit of the claims. Steps may be combined or divided, added or removed. These steps may be performed by any search program or indexing service on computer 110, or remotely running, for that matter.

At step 701, a first file is evaluated for indexing based on the file type of the file. An appropriate IFilter may be selected for indexing the file, if necessary. For example, if the file is a Word document, then code constituting a Word IFilter (or similar code) may be selected in order to access the file. Likewise, if the file to be evaluated is a list file, then a list IFilter may be selected. At decision 702, it is determined whether the file of interest is a reference to a file, or an actual file. If the file is not a reference, then at step 703 the file is accessed, and its extrinsic properties, intrinsic properties, and content are indexed as needed. Some files (e.g., program files, image files, other purely binary files) may not have content to be indexed and may not have any extrinsic properties. Such files may simply have their intrinsic properties indexed, and may not even need special code in the form of an IFilter in order to be accessed. Files with content for indexing may have their relevant content extracted and evaluated for index and/or search purposes.

If the file is a file reference, then at decision 704, it is determined whether the file to which the reference points is a file out of the normal scope of indexing. If so, then at step 703, the file is fully indexed. If, however, the file reference target is a local file within scope, then at step 705, merely the extrinsic properties of the file reference (if any) are indexed. In this fashion, the reference will only appear in search results when its extrinsic properties match the search. At decision 706, it is determined whether the file is a file container such as a list file or a zip file. If so, then the process is repeated for each of the files and/or file references within the container beginning with step 701. If the file is not a container (or if the container is empty), then at decision 708, it is determined whether there are any files left to index. If so, then those files are run through the process beginning at step 701. However, if no other files are to be indexed in this fashion, then the method ends.

CONCLUSION

The present subject matter has been described in terms of illustrative and exemplary embodiments thereof. It is to be understood that the subject matter defined in the appended claims is not necessarily limited to the specific features or acts described above. Rather, the specific features and acts described above are disclosed as example forms of implementing the claims.

The invention claimed is:

1. A system for indexing the contents of a shell namespace extension, comprising:
a memory, for storing electronic instructions;
a storage, for storing a plurality of files; and a processor, configured to accept the electronic instructions and to perform the steps of:
indexing the plurality of files;
encountering a file from the plurality of files, wherein the file contains at least one file reference;
accessing the file as a shell namespace extension to index the at least one file reference; and
for each file reference within the file:
determining whether the file reference refers to a target file within the scope of indexing,
responsive to the target file being within scope, indexing extrinsic properties of the file reference, and
responsive to the target file being outside scope, indexing content of the target file.

2. The system of claim 1, wherein the extrinsic properties comprise comments input by a user.

3. The system of claim 1, wherein determining whether the file reference refers to a target file within the scope of the indexing comprises determining a location of the target file.

4. The system of claim 1, wherein accessing the file as a shell namespace extension comprises accessing the file using a protocol handler.

5. The system of claim 1, wherein the file container comprises a list file.

6. The system of claim 1, wherein the file container comprises at least one of a zip format file, a cabinet format file, and a tape archive format file.

7. A computer-implemented method for indexing contents of a shell namespace extension, the method comprising:
receiving, at a processor, electronic instructions from a memory;
indexing a plurality of files stored in a storage;
encountering a file from the plurality of files, wherein the file contains at least one file reference;
accessing the file as a shell namespace extension to index the at least one file reference; and
for each file reference within the file:
determining whether the file reference refers to a target file within the scope of indexing,
responsive to the target file being within scope, indexing extrinsic properties of the file reference, and
responsive to the target file being outside scope, indexing content of the target file.

8. The method of claim 7, wherein the extrinsic properties comprise comments input by a user.

9. The method of claim 7, wherein determining whether the file reference refers to a target file within the scope of the indexing comprises determining a location of the target file.

10. The method of claim 7, wherein accessing the file as a shell namespace extension comprises accessing the file using a protocol handler.

11. The method of claim 7, wherein the file container comprises a list file.

12. The method of claim 7, wherein the file container comprises at least one of a zip format file, a cabinet format file, and a tape archive format file.

13. One or more computer storage media having computer-executable instructions embodied thereon, that when executed, cause a computing device to perform a method for indexing contents of a shell namespace extension, the method comprising:
receiving electronic instructions from a memory at a processor;
indexing a plurality of files stored in a storage;
encountering a file from the plurality of files, wherein the file contains at least one file reference;
accessing the file as a shell namespace extension to index the at least one file reference; and
for each file reference within the file,
determining whether the file reference refers to a target file within the scope of indexing,
responsive to the target file being within scope, indexing extrinsic properties of the file reference, and
responsive to the target file being outside scope, indexing content of the target file.

14. The media of claim 13, wherein the extrinsic properties comprise comments input by a user.

15. The media of claim 13, wherein determining whether the file reference refers to a target file within the scope of the indexing comprises determining a location of the target file.

16. The media of claim 13, wherein accessing the file as a shell namespace extension comprises accessing the file using a protocol handler.

17. The media of claim 13, wherein the file container comprises a list file.

18. The media of claim 13, wherein the file container comprises at least one of a zip format file, a cabinet format file, and a tape archive format file.

* * * * *